United States Patent [19]

Dwyer et al.

[11] Patent Number: 5,209,413
[45] Date of Patent: May 11, 1993

[54] DEVICE FOR SHREDDING CYLINDRICAL BALES

[76] Inventors: Paul Dwyer; Mark A. Dwyer, both of HC60, Box 63, Bartlett, Nebr. 68622

[21] Appl. No.: 962,288
[22] Filed: Oct. 16, 1992
[51] Int. Cl.⁵ .......................................... B02C 13/286
[52] U.S. Cl. .................. 241/101.7; 241/223; 241/280; 241/285.1; 241/605
[58] Field of Search .............. 241/101.7, 223, 235, 241/280, 605, 285.1, 285.2; 414/245, 111, 502

[56] References Cited

U.S. PATENT DOCUMENTS

| | | | |
|---|---|---|---|
| 1,910,852 | 5/1933 | Mosshart | 241/235 |
| 3,209,932 | 10/1965 | Schiltz | 214/505 |
| 3,298,550 | 1/1967 | Schiltz | 214/505 |
| 4,053,071 | 10/1977 | Schrag et al. | 241/506 |
| 4,068,804 | 1/1978 | Butler et al. | 241/101.7 |
| 4,101,081 | 7/1978 | Ritter et al. | 241/101.7 |
| 4,187,990 | 2/1980 | Lundahl et al. | 241/30 |
| 4,367,855 | 1/1983 | von der Heide | 241/283 |
| 4,376,607 | 3/1983 | Gibson | 414/24.6 |
| 4,471,602 | 9/1984 | Leigers | 56/13.9 |
| 4,531,880 | 7/1985 | Paques | 414/473 |
| 4,657,191 | 4/1987 | Dwyer et al. | 241/101.7 |
| 4,982,658 | 1/1991 | Knudson | 100/7 |
| 5,025,992 | 6/1991 | Niebur | 241/101.7 |
| 5,062,757 | 11/1991 | Eichenauer | 414/24.5 |
| 5,090,630 | 2/1992 | Kopecky et al. | 241/279 |

*Primary Examiner*—Mark Rosenbaum
*Assistant Examiner*—John M. Husar
*Attorney, Agent, or Firm*—Zarley, McKee, Thomte, Voorhees & Sease

[57] ABSTRACT

A bale shredding comprising an elongated wheeled frame having a first bale conveyor pivotally mounted thereon and moveable from an inclined position for loading bales onto the bale conveyor to a horizontally disposed transport positon. A bale shredder is mounted on the forward end of the wheeled frame at one side thereof forwardly of the forward end of the first bale conveyor. A second bale conveyor is positioned on the wheeled frame forwardly of the forward end of the first bale conveyor for conveying bales laterally into bale shredding drums. A pair of push rods are longitudinally movably mounted on the first bale conveyor for pushing the last bale thereon onto the second bale conveyor.

14 Claims, 10 Drawing Sheets

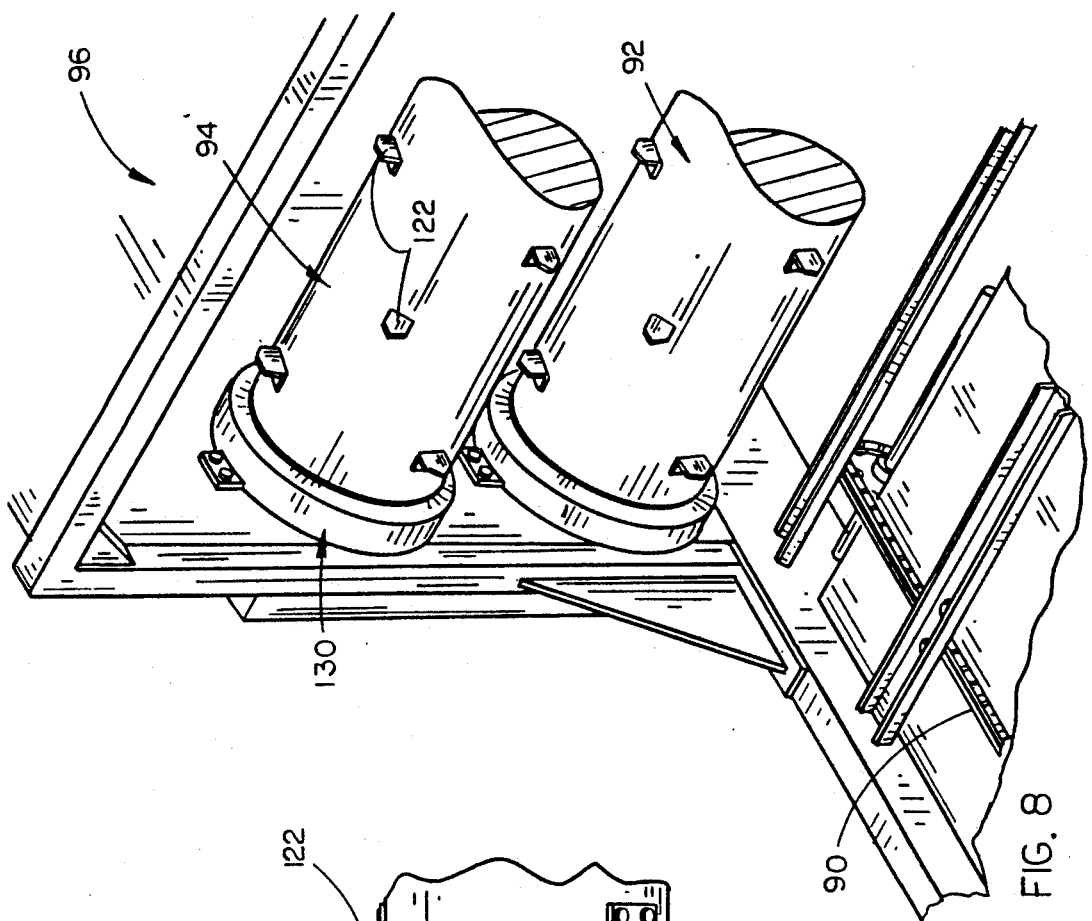
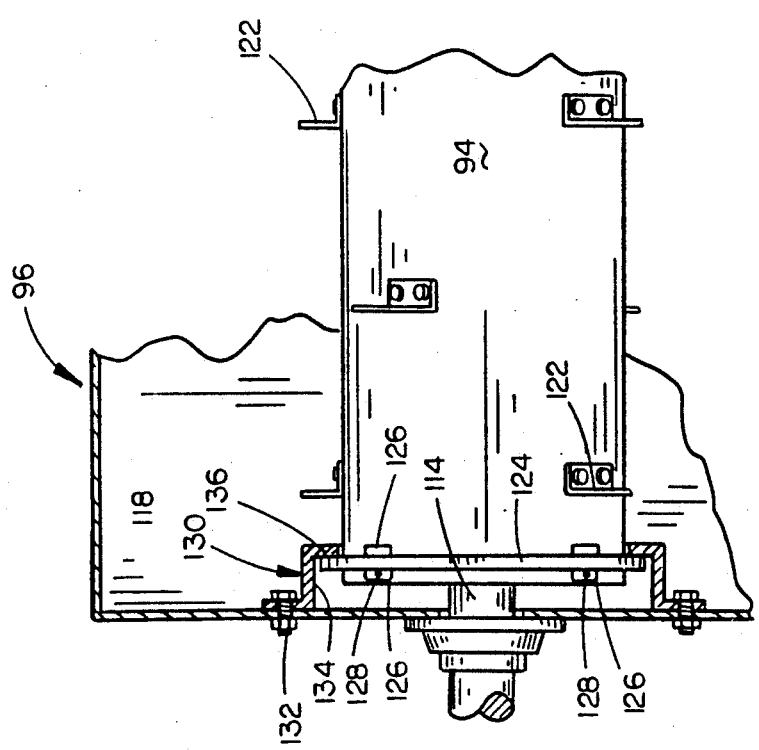
FIG. 8
FIG. 7

DEVICE FOR SHREDDING CYLINDRICAL BALES

BACKGROUND OF THE INVENTION

1. Field of the Invention

This invention relates to a bale shredding device and more particularly to a device for shredding large cylindrical bales.

2. Description of the Prior Art

In recent years, large cylindrical hay bales have become extremely popular. However, the large bales have been found to be difficult to feed to livestock. In U.S. Pat. No. 4,657,191, a bale shredding device is described wherein a plurality of large bales are positioned on a bale conveyor means with the ends of the bales being arranged in a fore to aft position thereon. In the device disclosed in U.S. Pat. No. 4,657,191, the bales on the bale conveyor are moved onto a bale shredding apparatus located at the forward end of the wheeled frame. A pusher assembly was provided to push the bale laterally into a pair of rotating shredding drums.

Although the shredding device of said patent did satisfactorily perform, it has been found that certain disadvantages were present in the prior art device. For example, the bale pusher apparatus of the prior art patent did work satisfactorily but was quite expensive to manufacture. Further, it was found that the twine from the bales being shredded tended to wrap around the supporting shafts for the rotating drums thereby creating a troublesome maintenance problem.

SUMMARY OF THE INVENTION

A device is described for shredding large cylindrical bales. The device comprises a wheeled frame having a bale conveyor means mounted thereon which is designed to receive the bales thereon with the ends of the bales being arranged in a fore to aft position. The bale conveyor means is pivotally moveable with respect to the wheeled frame so that the rearward end of the bale conveyor may be moved downwardly into ground engagement to facilitate the positioning of bales on the bale conveyor means. A pivotal support is mounted on the forward end of the wheeled frame and has a transversely extending conveyor mounted thereon which moves the bale laterally into a pair of rotating shredding drums. The drums include means on the ends thereof to prevent the twine from the bales from wrapping around the shafts of the rotating drums. A push rod assembly is mounted on the forward end of the bale conveyor for pushing the last bale on the bale conveyor onto the bale shredding support. Various safety mechanisms are provided to prevent damage to the equipment.

It is therefore a principal object of the invention to provide an improved device for shredding large cylindrical bales.

Yet another object of the invention is to provide a device for shredding cylindrical bales including a push rod assembly mounted on the forward end of the bale conveyor for pushing the last bale from the bale conveyor onto the bale shredding mechanism.

Still another object of the invention is to provide a device for shredding cylindrical bales including means for preventing twine from wrapping around the shafts of the shredding drums.

Still another object of the invention is to provide a device for shredding cylindrical bales including safety mechanisms for preventing damage to the equipment.

Yet another object of the invention is to provide a device for shredding cylindrical bales which is economical to manufacture, durable in use and refined in appearance.

DESCRIPTION OF THE DRAWINGS

FIG. 7 is a partial sectional view illustrating the means for preventing twine from the bales from wrapping around the drum shafts;

FIG. 8 is a partial perspective view of the rotating drums with the means mounted thereon for preventing twine from wrapping around the shafts of the drums;

DESCRIPTION OF THE PREFERRED EMBODIMENT

Figure 1:
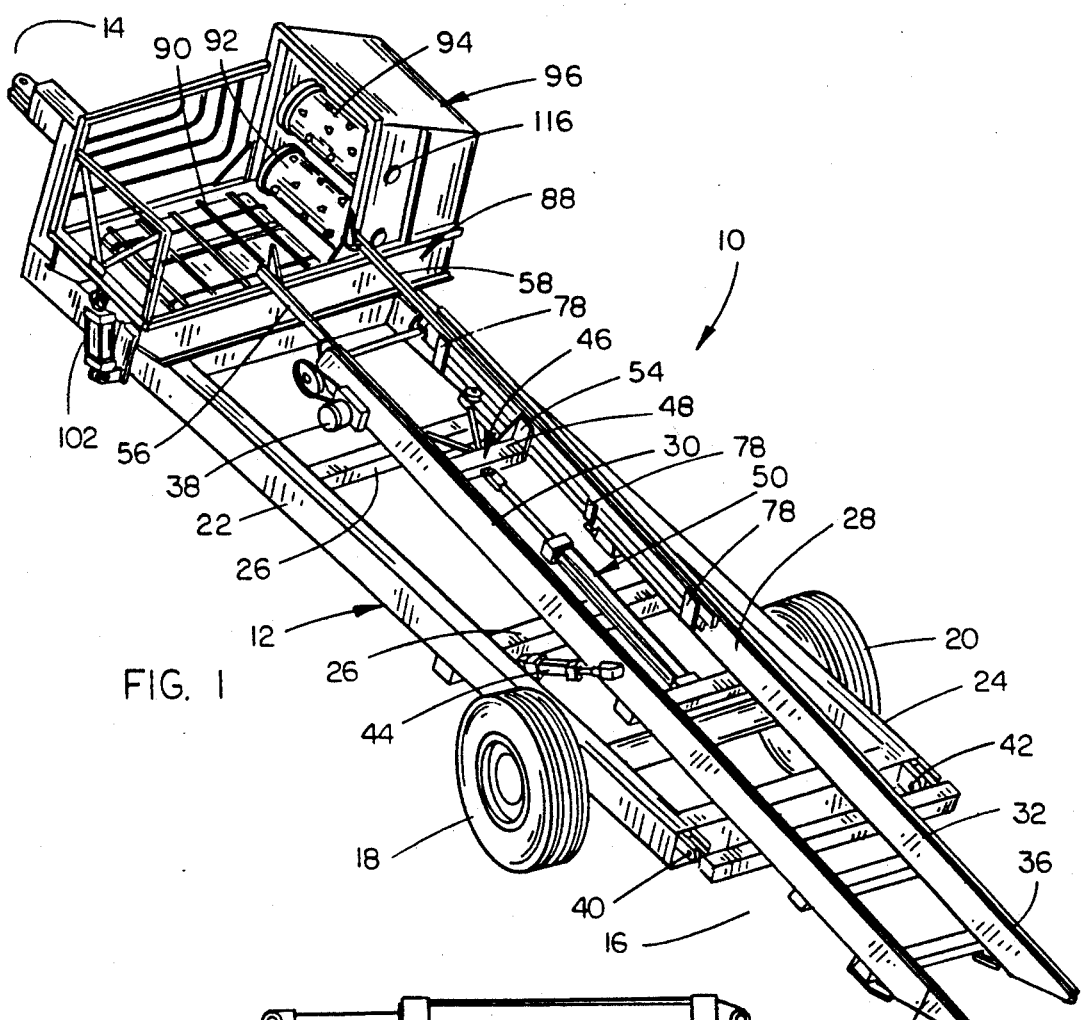
FIG. 1 is a rear perspective view of the device of this invention for shredding cylindrical bales.
Figure 2:
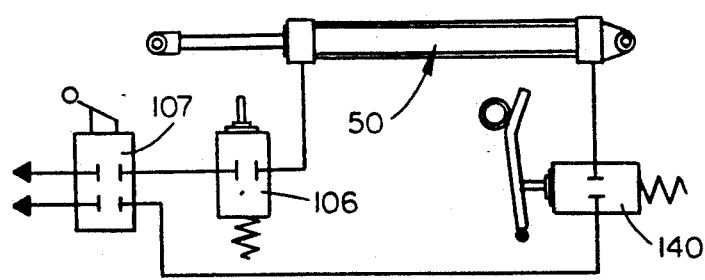
FIG. 2 is a schematic view illustrating various safety features associated with the invention.
Figure 2:
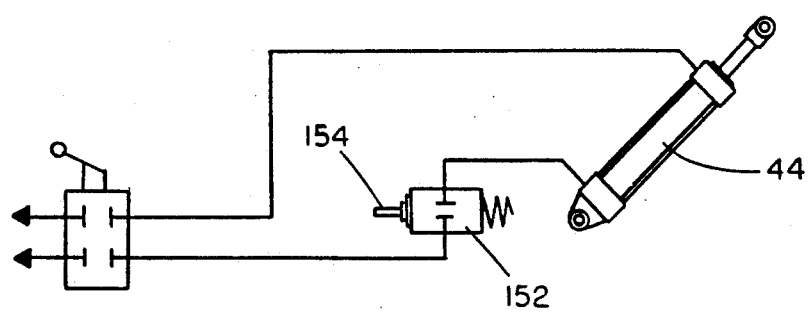

The numeral 10 generally designates the bale shredding apparatus of this invention. Device 10 includes an elongated wheeled frame means 12 having a forward end 14 and a rearward end 16. A pair of wheels 18 and 20 are provided on the wheeled frame means 12 for supporting the device in conventional fashion. Although the device 1 is shown in the drawings as comprising a trailer, it should be noted that the device could be positioned on a truck bed or the like although the trailer configuration is the preferred embodiment.

Figure 3:
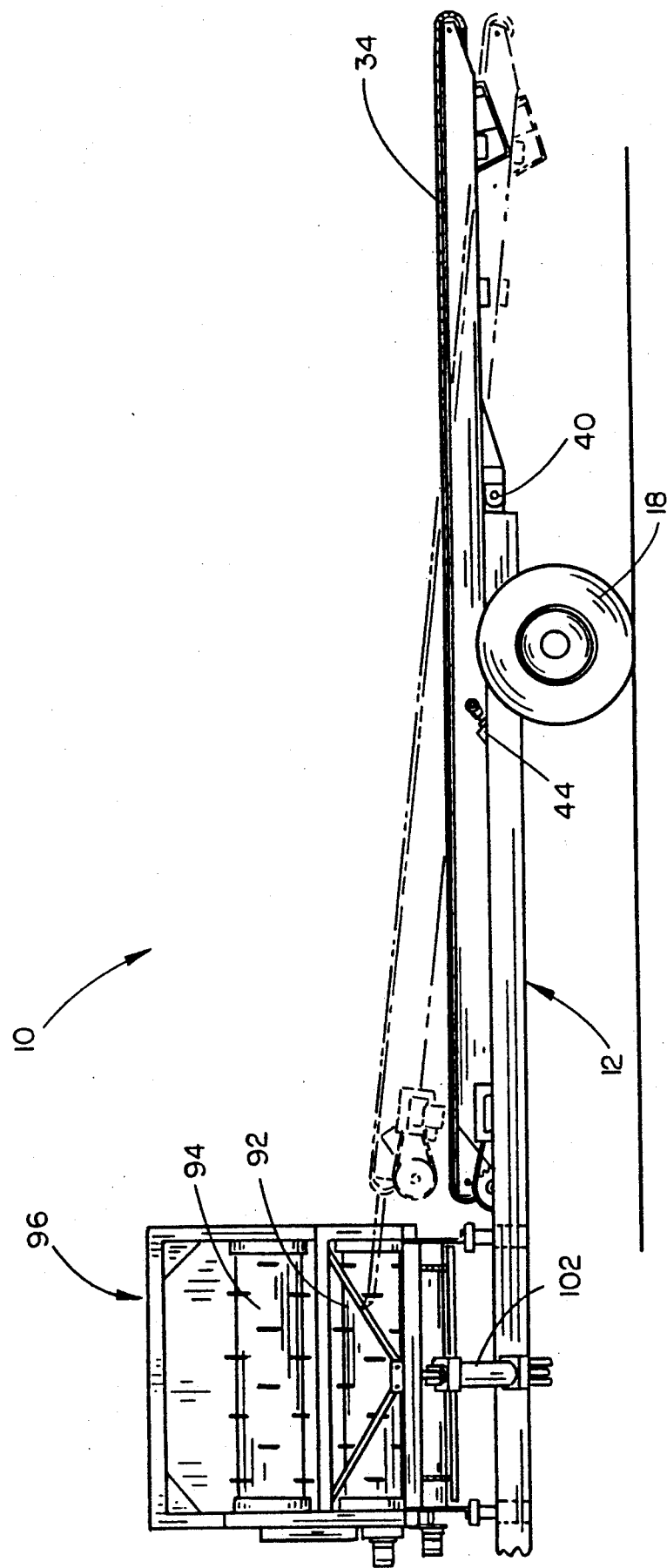
FIG. 3 is a side view of the invention illustrating the manner in which the bale push rods are extended to push a bale onto the bale conveyor and shredding support.
Figure 4:
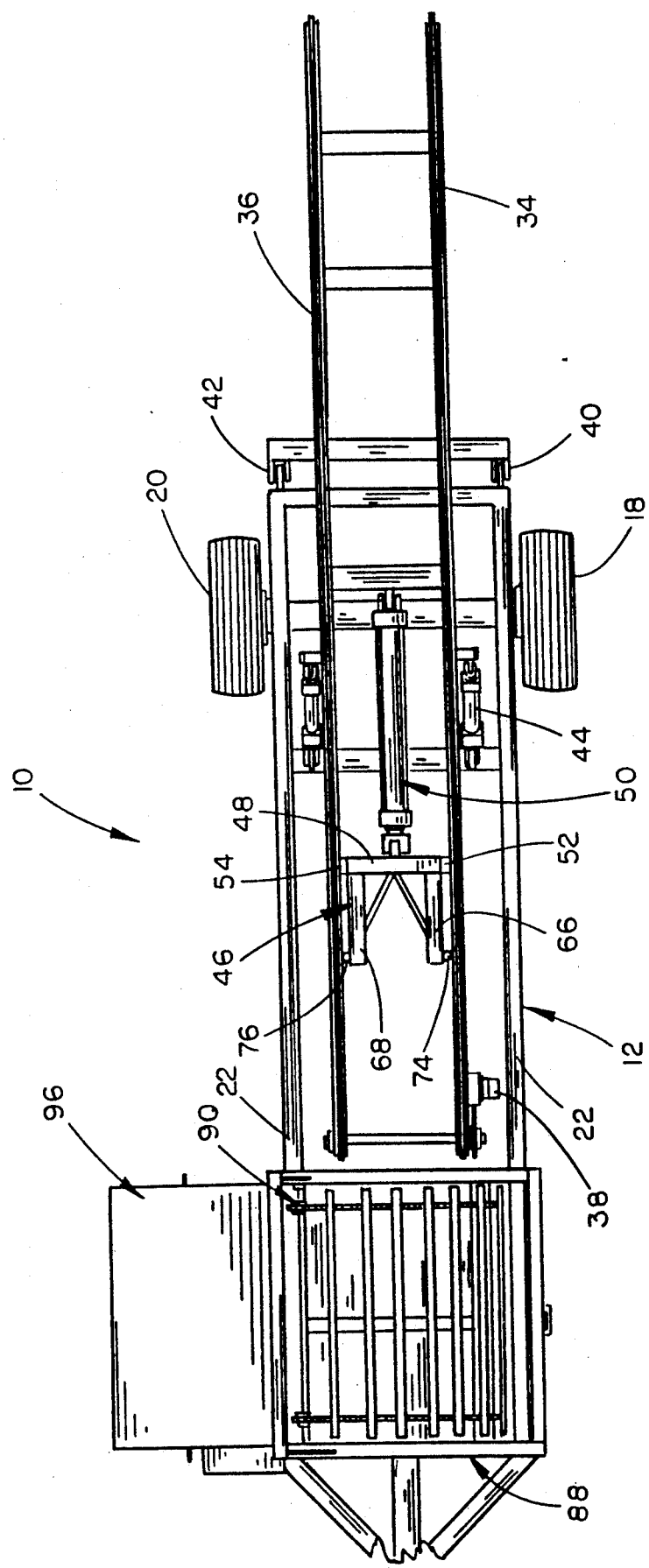
FIG. 4 is a top view of the device of this invention.

Frame means 12 includes a pair of longitudinally extending frame members 22 and 24 having a plurality of cross braces 26 extending therebetween. The numeral 28 generally refers to a first bale conveyor means pivotally mounted on the frame means 112 including elongated rails 30 and 32 having movable conveyor chains 34 and 36 mounted thereon and driven by hydraulic motor 38. The bale conveyor means 28 is pivotally secured to the rearward end of frame means 12 at 40 and 42 and may be pivoted from a normally horizontally disposed position as illustrated in FIG. 3 to the inclined position illustrated by broken lines in FIG. 3 and the position illustrated in FIG. 1 by means of lift cylinder 44 which is pivotally connected to one of the braces 26 and rail 30. Cylinder 44 is operatively connected to the hydraulic system of the tractor which would normally pull the device.

A bale push rod assembly 46 is provided at the forward end of the bale conveyor means 28 for pushing the last bale on the bale conveyor means 28 onto the bale conveyor 90 at the forward end of the device as will be described in more detail hereinafter. Push rod assembly 46 includes a transversely extending frame member 48 which is operatively connected to the push rod cylinder 50. Upstanding brackets 52 and 54 are welded to the outer ends of the frame member 48. The upper ends of the brackets 52 and 54 are welded to longitudinally extending push rods 56 and 58 respectively. An elongated wooden bearing 60 is secured to the underside of each of the push rods 56 and 58 to facilitate the longitudinal sliding movement of the push rods 56 and 58.

Figure 11:
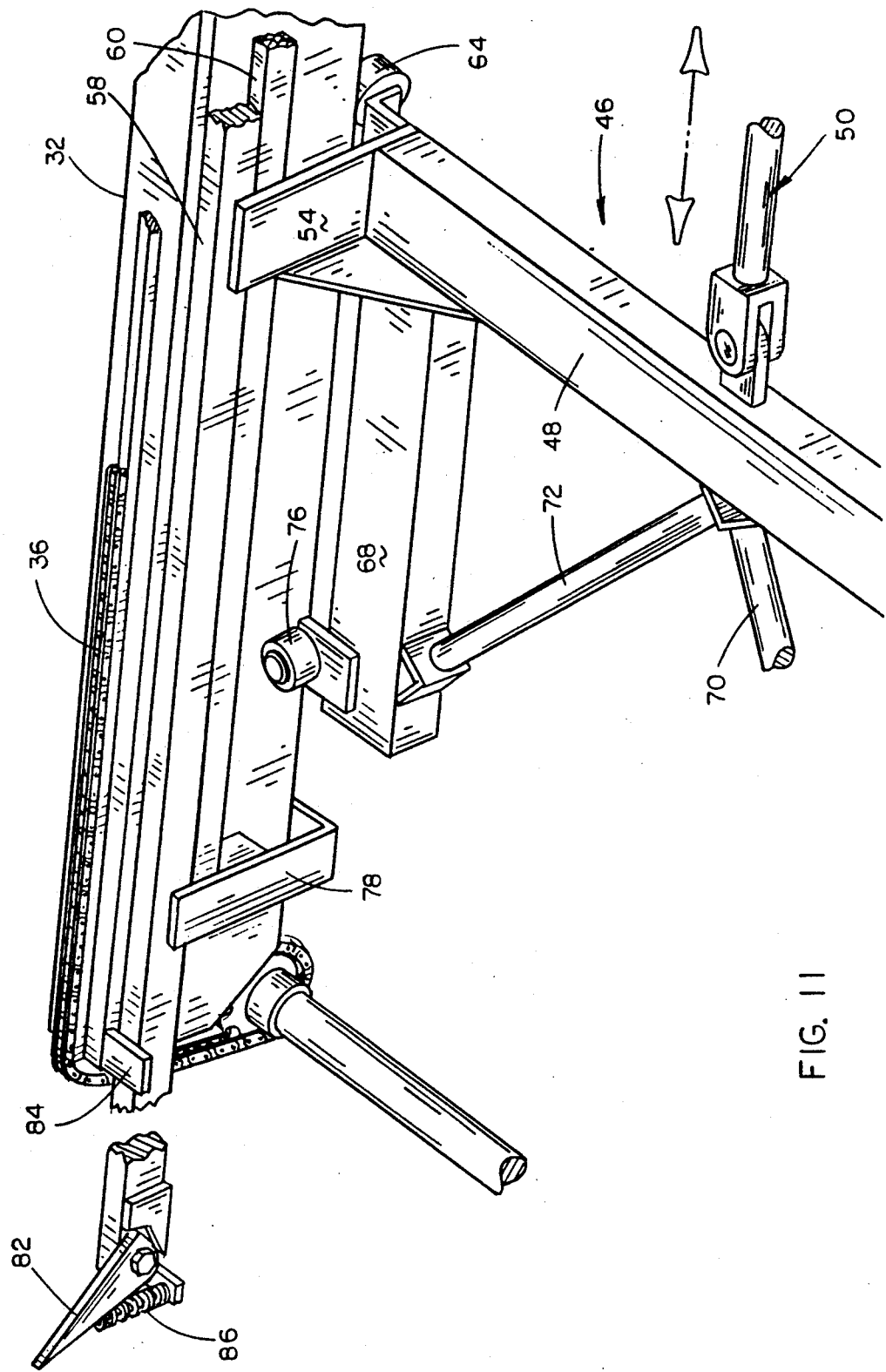
FIG. 11 is a partial perspective view of one of the bale pushers.

Guide rollers 62 (not shown) and 64 are operatively secured to the opposite ends of the frame member 48 and rollably engage the underside of the rails 30 and 32 respectively. Supports 66 and 68 are secured to and extend forwardly from the opposite ends of frame member 48 and have braces 70 and 72 secured thereto as best seen in FIG. 11. Guide rollers 74 and 76 are mounted on the forward ends of the supports 66 and 68 respectively and rollably engage the inner surface of the rails 30 and 32 respectively to aid in keeping the push rod assembly 46 in alignment during the movement thereof. A plurality of guides 78 are secured to the rails 28 and 30 to aid in guiding the push rods 54 and 56 respectively during the movement thereof Spring loaded teeth 80 and 82 are pivotally mounted on the forward ends of push rods 54 and 56 and are adapted to pivot upwardly into the position illustrated in FIG. 11 as the push rods 54 and 56 are extended from their retracted position so that the teeth 80 and 82 will engage the underside of the bale being moved to facilitate the movement thereof. Each of the teeth 80 and 82 are moved to a horizontally disposed and non-bale engaging position when the push rods 54 and 56 are in their retracted positions by means of the bracket 84 as is apparent from FIG. 11. As push rod 56 is moved to its inoperative or retracted position, tooth 82 passes beneath the bracket 84 which causes the tooth 82 to pivotally move downwardly against the resistance of the spring 86.

The numeral 88 refers generally to a platform or support 88 mounted on the forward end of the frame means 12 and having a bale conveyor 90 mounted thereon for conveying the bale thereon transversely into the bale shredding drums 92 and 94 rotatably mounted in the housing 96. The lower outer end of housing 96 is open so that the hay being shredded by the rotating drums 92 and 94 is deposited laterally of the device in a windrow type manner.

Figure 5:
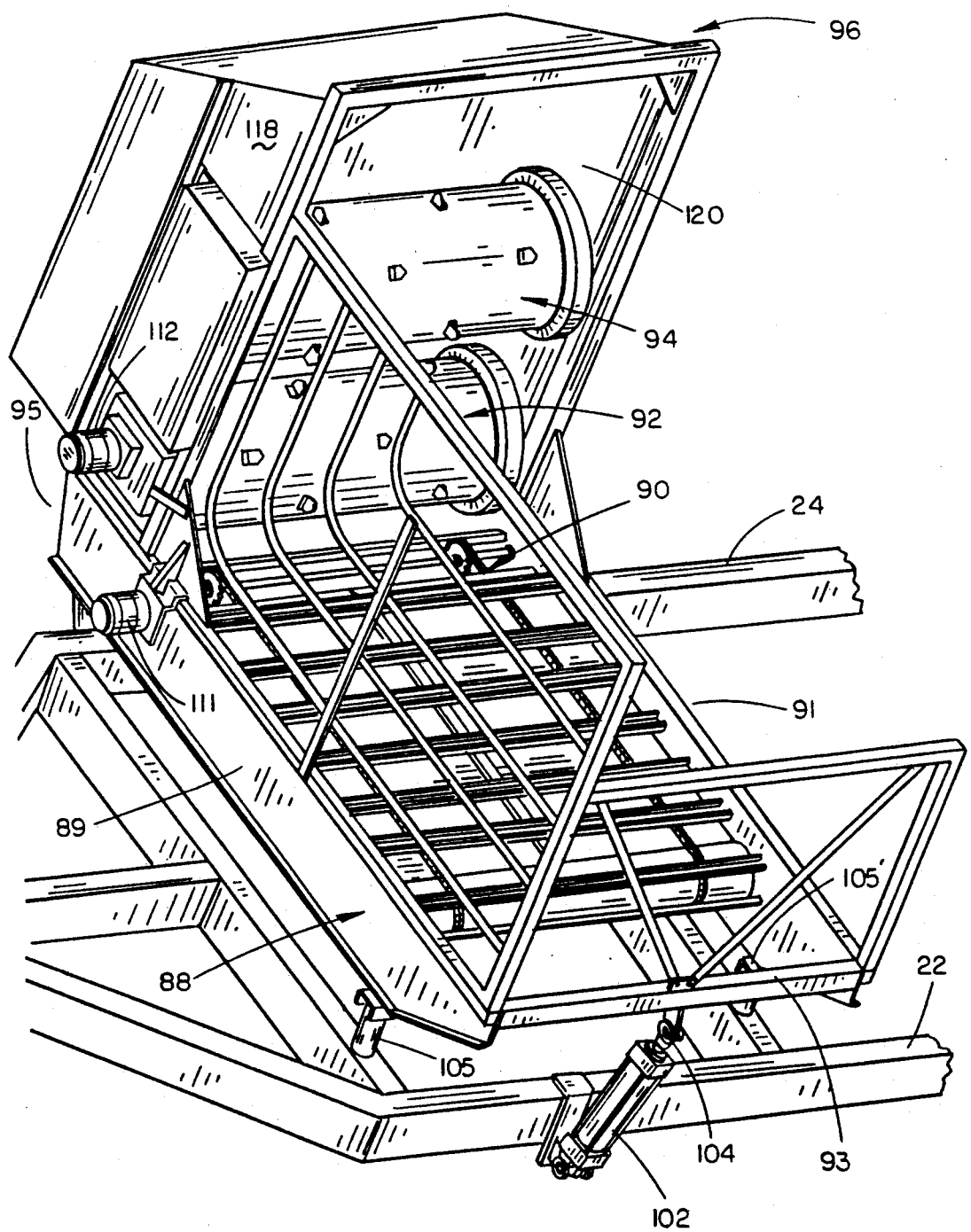
FIG. 5 is a front perspective view of the bale shredding apparatus located on the forward end of the wheeled frame means.
Figure 6:
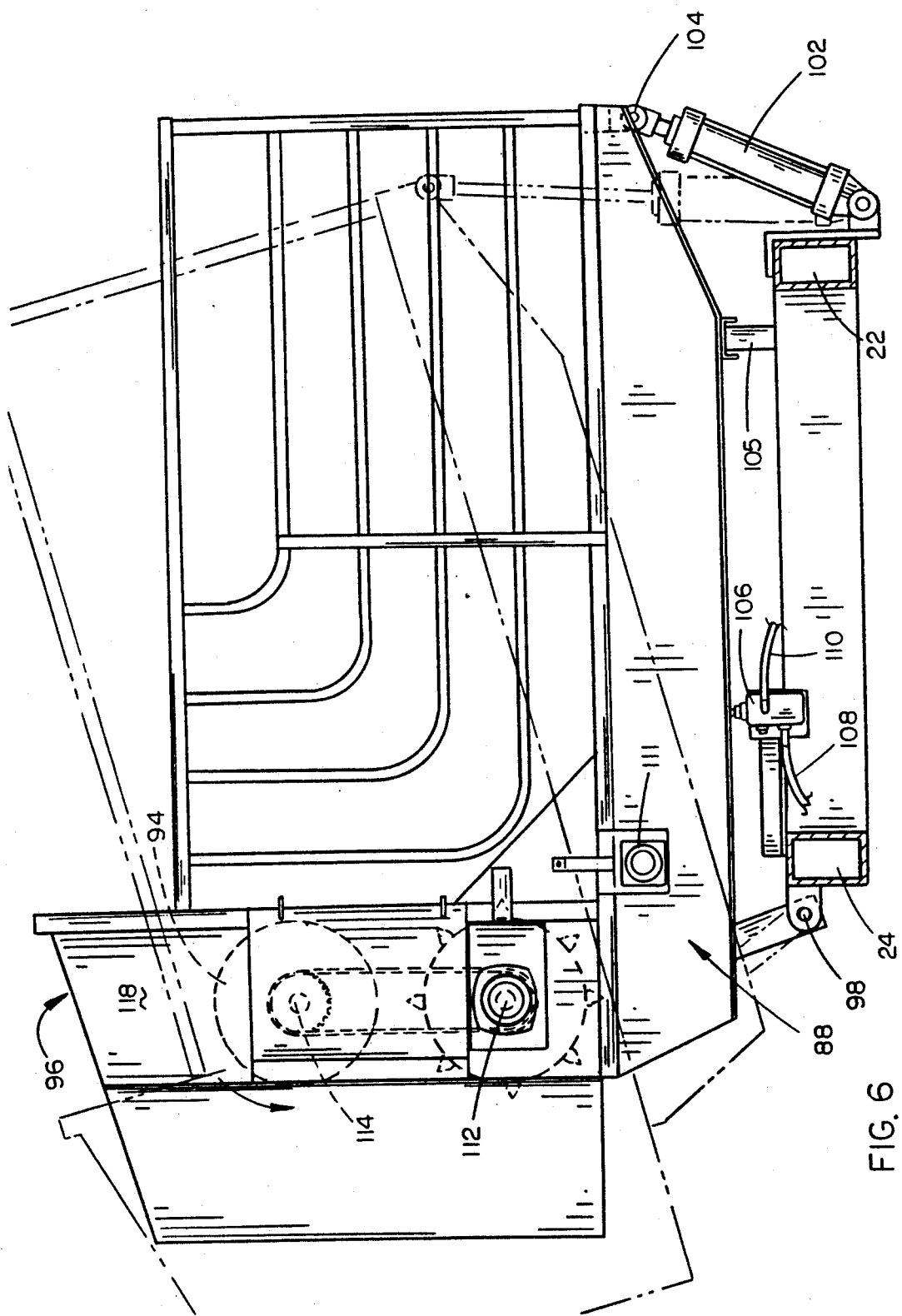
FIG. 6 is a front view of the bale shredding apparatus with the broken lines illustrating the manner in which the bale shredding apparatus may be pivoted or tipped to facilitate the shredding of the bale.
Figure 9:
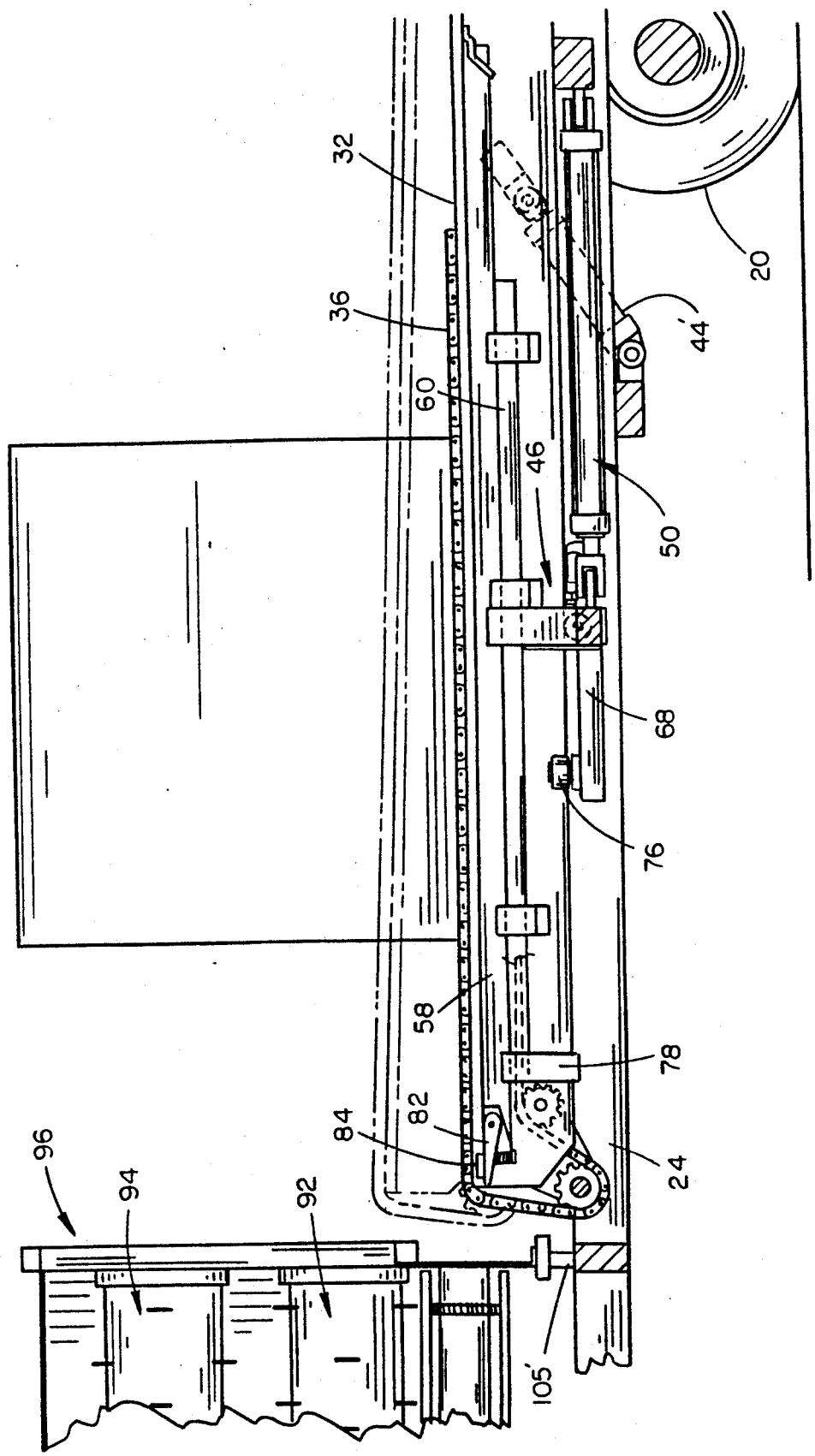
FIG. 9 is a partial longitudinal sectional view of the apparatus with the broken lines illustrating the position to which the bale conveyor may be pivoted.
Figure 10:
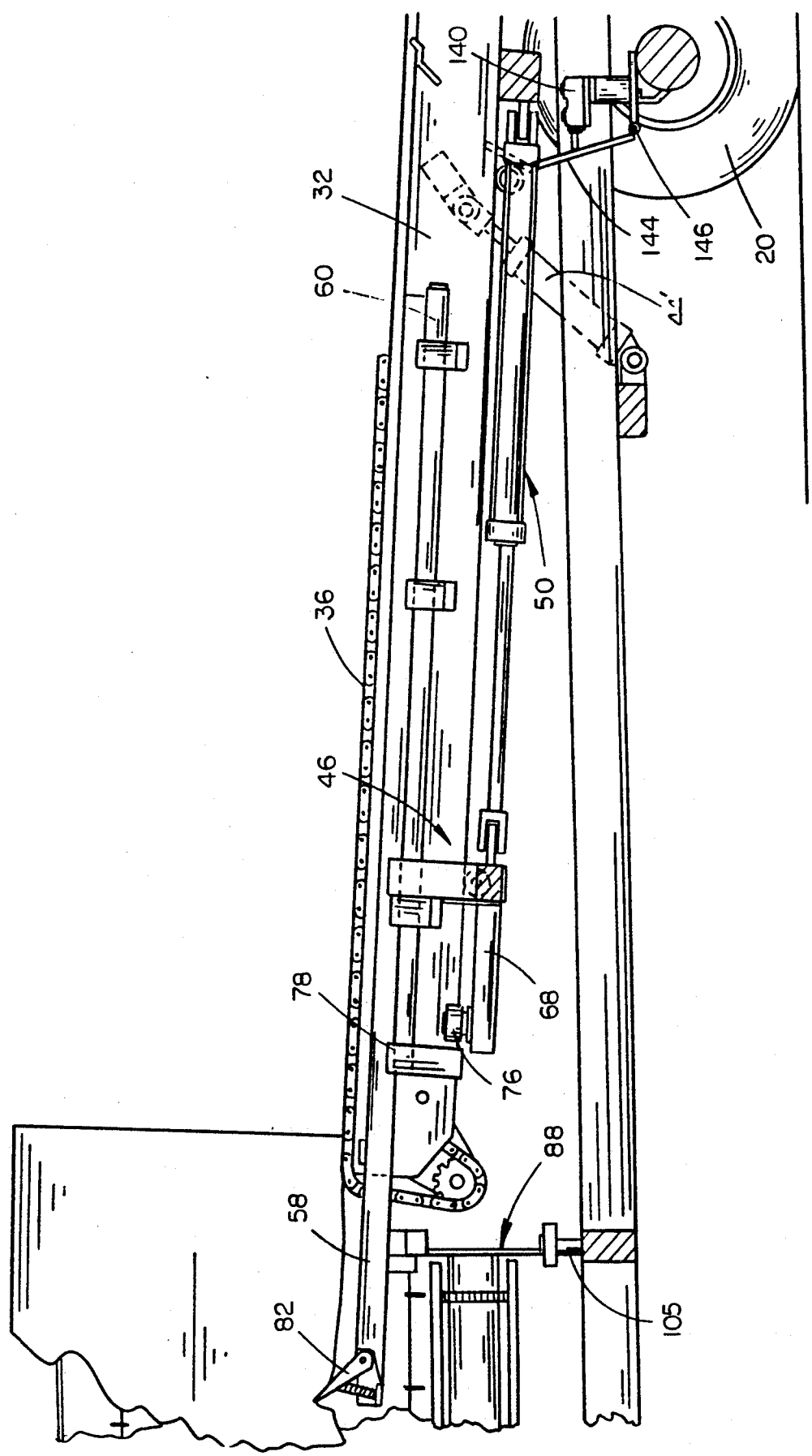
FIG. 10 is a view similar to FIG. 9 except that the bale pusher has been extended to force the last bale on the conveyor onto the bale shredding apparatus.

Support 88 includes a forward end 89, rearward end 91, and opposite sides 93 and 95. Support 88 is pivotally connected to frame member 24 at a pair of spaced-apart locations 98 and 100 (not shown) and is normally positioned in the position illustrated by solid lines in FIG. 6. However, support 88 may be pivotally moved from the position illustrated by solid lines in FIG. 6 to the position illustrated by broken lines in FIG. 6 by means of the hydraulic cylinder 102 which is pivotally connected to frame member 22 and to side 93 of support 88 at 104. Support means 88 normally rests upon the upstanding supports 105 and 105' as illustrated in FIG. 5. As will be described in more detail hereinafter, the numeral 106 refers to a safety valve having hoses 108 and 110 operatively connected thereto.

Bale conveyor 90 is conventionally mounted on the support 88 and is operated by the reversible hydraulic motor 111 which is operatively connected to the tractor hydraulic system. Hydraulic motor 112 is operatively connected to the drums 92 and 94 for rotating the drums in a counter clockwise manner as viewed in FIG. 6. Inasmuch as each of the drums 92 and 94 are identical, only drum 94 will be described in detail. Drum 94 is cylindrical and has a pair of shafts 114 and 116 extending from the opposite ends thereof which are rotatably mounted in the upstanding supports 118 and 120 forming a part of housing 96. Drum 94 has a plurality of cutting teeth 122 extending from the periphery thereof which are adapted to shred the hay coming into the contact with the rotating drum.

Heretofore, a very troublesome problem was encountered when hay bales were shredded due to the fact that the hay bales are wrapped with twine. As the rotating drums of the prior art are operated to shred the bales, the twine from the bales wrapped around the supporting shafts for the drums to create a problem which seriously affected the operation of the drums. To avoid the problem, applicants have provided structure on the opposite ends of the drums 92 and 94 for preventing the twine from the bales from wrapping around the shafts of the drums.

Inasmuch as the structure at each end of each of the drums 92 and 94 is identical, only the structure at one end of drum 94 will be described. As seen in FIG. 7, an annular ring 124 is removably secured to one end of the drum 94 by means of bolts or screws 126 extending through ears 128 and into the drum 94. Ears 128 are welded to the ring 124 in conventional fashion. The fact that the ring 124 is removably mounted on the drum 94 expedites installation and maintenance thereof. An annular ring-shaped collar 130 is removably secured to support 118 by means of a plurality of bolts 132 as best seen in FIG. 7. Collar 130 includes a first collar portion 134 which extends inwardly from support 118 in a spaced condition with respect to the ring 124 as seen in FIG. 7. Collar 130 also includes a collar portion 136 which extends parallel to the support 118 towards the periphery of the drum 94 inwardly of the ring 124. Thus, collar 130 receives and rotatably embraces the ring 124 in the manner illustrated in FIG. 7. The relationship of the ring 124 and the collar 130 ensures that twine cannot pass between collar portion 130 and the ring 124 and wrap around shaft 114.

Figure 12:
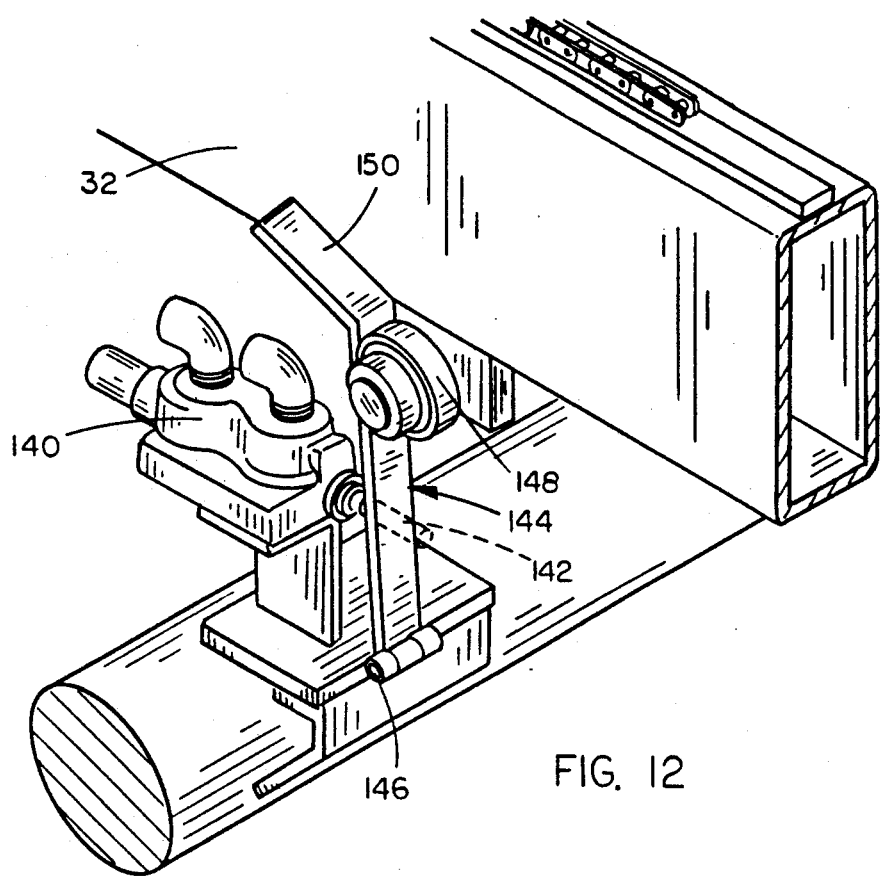
FIG. 12 is a perspective view of one of the safety mechanisms.
Figure 13:
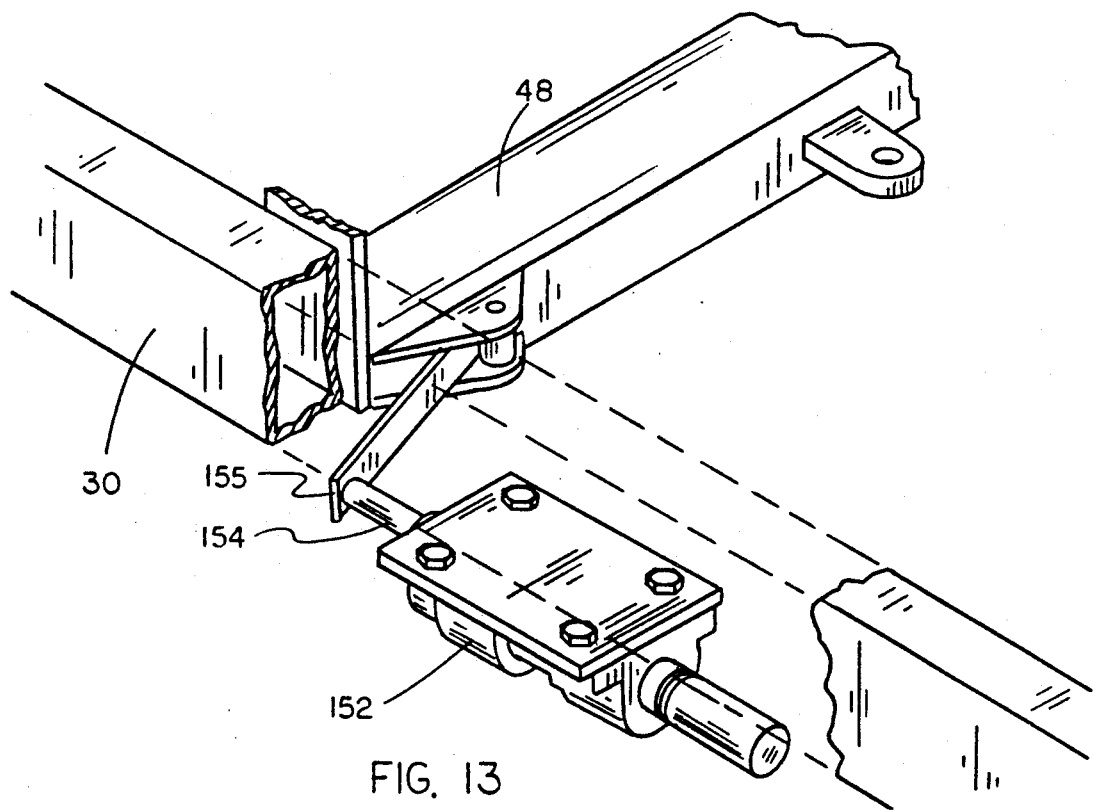
FIG. 13 is a perspective view of another safety mechanism.

Although the shredding device of this invention works without safety devices to prevent damage to the equipment, it is preferred that certain safety devices or mechanisms be provided. As stated, safety valve 106 is mounted on the frame means 12 and is operatively connected to the manual valve 107 for hydraulic cylinder 50 so that the push rods 56 and 58 cannot be extended unless the support 88 is the position illustrated by solid lines in FIG. 6 so as to open safety valve 106 to permit hydraulic fluid to flow to hydraulic cylinder 50. The numeral 140 refers to a safety valve which also controls the operation of cylinder 50. Valve 140 includes a spring loaded valve plunger 142 which is normally urged outwardly from the body of the valve. The outer end of plunger 142 is in engagement with a pivotal arm 144 which is pivoted to the axle of the wheeled frame means 10 at 146. The numeral 148 refers to a roller which is mounted on the underside of rail 32 for movement therewith. Arm 144 includes an angular portion 150 at the upper end thereof which extends upwardly and rearwardly as viewed in the drawings. Thus, when the bale conveyor means 28 is in the horizontal position, roller 148 maintains valve 140 in a closed position so that the push rods 56 and 58 cannot be extended by hydraulic cylinder 50. If push rods 56 and 58 were permitted to be extended when the bale conveyor means 28 was in the horizontal position, the push rods 56 and 58 would strike the rearward side of the support 88 and would cause damage to the equipment. When bale conveyor means 28 is pivoted to the inclined position, roller 148 will be positioned above and forwardly of the inclined portion 150 of the member 144 as indicated by broken lines in FIG. 12, so that the plunger 142 may move outwardly to permit fluid to flow to the hydraulic cylinder 50 to permit the push rods 56 and 58 to be extended.

Yet another safety device is provided for preventing the bale conveyor 28 from moving from the inclined position to the horizontal position when the push rods 56 and 58 are extended so as to prevent damage to the push rods. Valve 152 is mounted on rail 30 and includes a plunger 154 extending therefrom. Arm 155 on the rearward end of bale push rod assembly 46 operatively engages the plunger 54 to open the valve 152 when the push rods 56 and 58 are in their retracted position so that hydraulic fluid is permitted to flow to the hydraulic cylinder 44. Unless bale push rod assembly 46 has been retracted so as to open the valve 152, lift cylinder 44 cannot be operated to lower or raise the bale conveyor means 28.

In operation, the lift cylinder 44 is extended to lower the rearward end of the bale conveyor means 28 into ground engaging position. The wheeled frame means 10 is then moved rearwardly with respect to a bale resting on the ground with the ends thereof in a fore to aft position. The conveyor chains 34 and 36 are then operated so that the bale will be pulled upwardly onto the bale conveyor means 28 and moved forwardly thereon. Additional bales are loaded onto the bale conveyor means 28 until the bale conveyor means 28 is fully loaded or the desired number of bales are loaded thereon. The lift cylinder 44 is then retracted so that the bale conveyor means 28 is lowered to its horizontally disposed position. The apparatus is then taken to the desired position by the tractor pulling the same.

When it is desired to shred bales, the forward end of bale conveyor means 28 is tilted upwardly by the lift cylinder 44 so that the upper forward end of the bale conveyor means 28 is positioned approximately level with the conveyor 90. The chains 34 and 36 on bale conveyor means 28 are then operated to cause the forwardmost bale thereon to be moved onto the bale conveyor 90. The forwardmost bale is moved onto the bale conveyor 90 by the action of the conveyor chains 34 and 36 and by the pushing movement of the bale immediately therebehind. The drums 92 and 94 are then operated so as to rotate in conventional fashion. Conveyor 90 is operated so as to cause the bale to be moved towards the rotating drums 92 and 94 so that the teeth 122 thereon will shred the bale from the side thereof. It has been found that the shredding action is enhanced by raising or tilting the support 88 by means of the hydraulic cylinder 102 so that the bale will not only be urged into engagement with the rotating drums 92 and 94 by the conveyor 90 but also by gravity. As the bale is shredded, the shredded hay is deposited from the lower outer end of the housing 96 as in U.S. Pat. No. 4,657,191.

When the bale has been shredded, the support 88 is lowered to its horizontal position and another bale is moved onto the conveyor 90 by the conveyor chains 34 and 36. The support 88 is then again moved to its tipped position in the manner just described.

Although the conveyor chains 34 and 36 on conveyor means 28 satisfactorily move all of the bales on the conveyor 28 onto the conveyor 90, it has been found that some difficulty is experienced in moving the last bale on the conveyor means 28 onto the conveyor 90 since there is not a bale behind the bale being moved forwardly by the conveyor chains 34 and 36. Thus, when the last bale is to be moved onto the conveyor 90, the hydraulic cylinder 50 is extended so that the push rods 56 and 58 move forwardly with respect to the rails 30 and 32 with the teeth 80 and 82 on the forward ends of the push rods 56 and 58 engaging the underside or the rearward end of the last bale to push the last bale onto the conveyor 90. As previously stated, the safety valve means 106 is provided to prevent the extension of the push rods 56 and 58 when the support 88 is pivoted upwardly and to prevent the extension of the push rods 56 and 58 unless the bale conveyor means 28 is in its upwardly inclined position.

Once the last bale has been moved onto the bale conveyor 90 by the push rods 56 and 58, the push rods 56 and 58 are retracted by the cylinder 50. The bale conveyor means 28 cannot be lowered to its horizontal position until such time as the valve 152 is retracted to permit the retraction of lift cylinder 44 to lower the conveyor means 28.

The structure described in FIGS. 7 and 8, namely the ring 124 and the collar 130, at each end of each drum, ensures that the twine from the shredded bales will not wrap around the shafts of the drums thereby eliminating troublesome maintenance problems.

Thus it can be seen that a novel bale shredding device has been described which ensures that the bale being shredded will be moved into contact with the shredding rollers not only by a bale conveyor but also by gravity created by the tipping of the bale support at the forward end of the device. Further, it can be seen that a novel means has been provided for pushing the last bale on the bale conveyor means onto the bale shredding apparatus. It can also be seen that a novel apparatus has been provided for preventing twine from wrapping around the shafts at the opposite ends of the rotating shredding drums. Thus it can be seen that the invention accomplishes at least all of its stated objectives.

We claim:

1. A device for shredding cylindrical bales comprising, a wheeled frame means having rearward and forward ends and opposite sides, an elongated first bale conveyor means pivotally mounted on said frame means and having rearward and forward ends, means for pivotally moving said first bale conveyor means between a substantially horizontally disposed position to an inclined position wherein the rearward end of said first bale conveyor means is positioned adjacent the ground for facilitating the loading of one or more cylindrical bales on said first bale conveyor means whereby the ends of said bales are arranged in a fore and aft relationship on said first bale conveyor means, means for operating said first bale conveyor means for conveying the bales from the rearward end of said first bale conveyor means towards the forward end thereof, a bale shredding apparatus at the forward end of said wheeled frame means at one side thereof and forwardly of the forward end of said first bale conveyor means, a bale receiving means on said frame means forwardly of the forward end of said first bale conveyor means and laterally of said bale shredding apparatus for receiving a bale thereon from the forward end of said first bale conveyor means, means for moving the bale on said bale receiving means laterally towards said bale shredding apparatus, and bale engagement means at the forward end of said first bale conveyor means, said bale engagement means being movable from a first position to a second position for selectively moving a bale positioned on the forward end of said first bale conveyor means onto said bale receiving means.

2. The device of claim 1 wherein said means for moving the bale towards said bale shredding apparatus comprises a second bale conveyor means.

3. The device of claim 1 wherein said bale engagement means comprises pusher means longitudinally moveably mounted on the forward end of said first bale conveyor means for engaging the bale which is positioned on the forward end of said first bale conveyor means for pushing the bale onto said bale receiving means.

4. The device of claim 1 wherein said bale receiving means has opposite ends and wherein one end of said bale receiving means is pivotally secured to said frame means adjacent said bale shredding apparatus so that the other end of said bale receiving means may be pivotally moved from a first position, upwardly relative to said frame means to a second position, to urge the bale thereon, through gravity, towards said bale shredding apparatus.

5. The device of claim 4 including means for pivotally moving said bale receiving means.

6. The device of claim 1 including a control means operatively associated with said bale engagement means for preventing the actuation of said bale engagement means unless said first bale conveyor means is in its inclined position so that said bale engagement means will not come into engagement with said bale receiving means.

7. The device of claim 4 including control means operatively associated with said bale engagement means which renders said bale engagement means inoperative unless said bale receiving means is in its said first position.

8. The device of claim 1 wherein a lift cylinder interconnects first bale conveyor means and said frame means for pivotally moving said first bale conveyor means relative to said frame means, and wherein a control means is associated with said bale engagement means for rendering said lift cylinder inoperative unless said bale engagement means is in its said first position.

9. The device of claim 1 wherein said bale engagement means includes a pair of spaced apart push rods longitudinally movably mounted on the forward end of said first bale conveyor means.

10. The device of claim 9 wherein each of said push rods has a pivotal tooth mounted thereon for engagement with the bale being pushed onto said bale receiving means.

11. The device of claim 10 wherein each of said teeth is spring loaded and is movable from a first inoperative position when said push rods are in their said first position, to a second bale engaging position as said push rods are being longitudinally moved towards said bale receiving means.

12. The device of claim 9 wherein said bale receiving means has opposite ends and wherein one end of said bale receiving means is pivotally secured to said frame means adjacent said bale shredding apparatus so that the other end of said bale receiving means may be pivotally moved from a first position, upwardly relative to said frame means, to a second position, to urge the bale thereon, through gravity, towards said bale shredding apparatus.

13. The device of claim 1 wherein said bale shredding means includes a pair of cylindrical, horizontally disposed shredding rollers rotatably mounted on said frame means, said shredding rollers having means at the opposite ends thereof for preventing bale twine from wrapping therearound.

14. The device of claim 1 wherein said bale shredding means includes at least one cylindrical, horizontally disposed shredding roller having shaft portions extending from the opposite ends thereof, said shredding roller having an annular ring-shaped member extending outwardly therefrom adjacent each of its ends, said bale shredding means including substantially flat, upstanding supports at the opposite ends of said roller, said shafts being rotatably mounted on said flat supports, and an annular, ring-shaped collar secured to each of said flats supports which receives an end of said roller and which receives one of said ring-shaped members therein to prevent bale twine from wrapping around said shafts.

* * * * *